(12) United States Patent
Hess

(10) Patent No.: US 12,214,433 B2
(45) Date of Patent: Feb. 4, 2025

(54) METHOD FOR PRODUCING TEETH, TOOL AND MACHINE COMPONENT

(71) Applicant: Flender GmbH, Bocholt (DE)

(72) Inventor: Ralf Hess, Bocholt (DE)

(73) Assignee: Flender GmbH, Bocholt (DE)

( * ) Notice: Subject to any disclaimer, the term of this patent is extended or adjusted under 35 U.S.C. 154(b) by 579 days.

(21) Appl. No.: 17/613,396

(22) PCT Filed: Mar. 11, 2020

(86) PCT No.: PCT/EP2020/056482
§ 371 (c)(1),
(2) Date: Nov. 22, 2021

(87) PCT Pub. No.: WO2020/239281
PCT Pub. Date: Dec. 3, 2020

(65) Prior Publication Data
US 2022/0241880 A1 Aug. 4, 2022

(30) Foreign Application Priority Data
May 28, 2019 (EP) .................................... 19176917

(51) Int. Cl.
*B23F 1/06* (2006.01)
*G05B 19/18* (2006.01)

(52) U.S. Cl.
CPC .............. *B23F 1/06* (2013.01); *G05B 19/186* (2013.01); *G05B 2219/37334* (2013.01)

(58) Field of Classification Search
CPC ................................ B23F 1/06; F16H 55/0806
See application file for complete search history.

(56) References Cited

U.S. PATENT DOCUMENTS

| 6,101,892 A * | 8/2000 | Berlinger, Jr. ...... F16H 55/0826 74/462 |
| 2009/0064812 A1* | 3/2009 | Gutmann ................ F16H 55/08 74/462 |

(Continued)

FOREIGN PATENT DOCUMENTS

| CN | 105817713 | 8/2016 |
| CN | 107020422 | 8/2017 |

(Continued)

OTHER PUBLICATIONS

International Search Report issued by the European Patent Office in International Application PCT/EP2020/056482 on Jun. 11, 2020.

(Continued)

*Primary Examiner* — Kyle A Cook
(74) *Attorney, Agent, or Firm* — Henry M. Feiereisen LLC

(57) ABSTRACT

A method for producing a tooth geometry includes selecting a root-side starting contour configured as an ellipse segment and a head-side partial contour of a tooth; selecting an adaptation region for at least a part of the root-side starting contour; determining for the adaptation region a correction specification determined using a correction function configured as an at least third-order polynomial having at least one adjustable function parameter comprising adjustable coefficients; modifying the root-side starting contour using the correction specification to form a root-side final contour, and producing the tooth geometry by chip-removing machining based on the head-side partial contour and the root-side final contour. Also disclosed are a computer program product for carrying out the method, a tool for manufacturing the tooth geometry based on the method, and a machine component having the tooth geometry.

10 Claims, 4 Drawing Sheets

(56) References Cited

U.S. PATENT DOCUMENTS

| | | | |
|---|---|---|---|
| 2011/0083523 A1* | 4/2011 | Huang | F16H 55/08 |
| | | | 74/462 |
| 2011/0113911 A1* | 5/2011 | Zsolt | F16H 55/0806 |
| | | | 74/460 |
| 2014/0366668 A1 | 12/2014 | Kajiwara et al. | |
| 2016/0010739 A1* | 1/2016 | Schneider | F16H 55/08 |
| | | | 74/457 |
| 2017/0008105 A1* | 1/2017 | Wuerfel | G05B 19/186 |
| 2017/0008107 A1 | 1/2017 | Wuerfel | |
| 2018/0001403 A1* | 1/2018 | Kitayama | B23F 5/163 |

FOREIGN PATENT DOCUMENTS

| | | |
|---|---|---|
| CN | 107186288 | 9/2017 |
| CN | 109145487 | 1/2019 |
| DE | 102006015521 | 4/2007 |
| DE | 102008045318 | 10/2009 |
| DE | 102013004861 | 2/2014 |
| DE | 102015009154 | 1/2017 |

OTHER PUBLICATIONS

Chinese Search Report issued on May 27, 2022 with respect to counterpart Chinese patent application 202080039771.5.
Translation of Chinese Search Report issued on May 27, 2022 with respect to counterpart Chinese patent application 202080039771.5.

\* cited by examiner

METHOD FOR PRODUCING TEETH, TOOL AND MACHINE COMPONENT

CROSS-REFERENCES TO RELATED APPLICATIONS

This application is the U.S. National Stage of International Application No. PCT/EP2020/056482, filed Mar. 11, 2020, which designated the United States and has been published as International Publication No. WO 2020/239281 A1 and which claims the priority of European Patent Application, Ser. No. 19/176,917.3, filed May 28, 2019, pursuant to 35 U.S.C. 119 (a)-(d).

BACKGROUND OF THE INVENTION

The invention relates to a method for producing a serration and to a computer program product which is configured to carry out this method. The invention also relates to a tool which is configured on the basis of the method according to the invention. The invention likewise relates to a machine component which is equipped with a serration according to the invention.

A serration geometry which has a tooth edge that has an involute shape above a tooth root region is known from DE 10 2006 015 521 B3. The segment having the involute shape merges into an ellipse shape in the direction of an adjoining tooth root region. The ellipse shape is in this case configured as an ellipse segment, the long semi-axis of which is inclined with respect to a radial, as seen in a normal section plane.

Document DE 10 2013 004 861 83 discloses a serration of a cogwheel which has a tooth edge that has an involute-shaped segment. In the direction of a tooth root, the involute-shaped segment merges into a Bézier curve.

Serrations are used in a multiplicity of machine components and machines. In many applications, there is a need for serrations which offer a high mechanical load-bearing capacity and high reliability, but at the same time can be produced simply and economically. The object of the invention is to provide a serration which offers an improvement in at least one of the aspects outlined.

SUMMARY OF THE INVENTION

The object is achieved by the method according to the invention for producing a serration. The serration to be produced comprises a multiplicity of teeth and is to be formed on a serration blank. In a first step, a starting contour and an adjacent head-side partial contour of the tooth is selected. The head-side partial contour essentially describes the segment of a tooth edge on which another serration, for example a mating wheel, rolls during operation. This is followed by the root-side starting contour, without there needing to be a continuous transition between the root-side starting contour and the head-side partial contour in the first step. The head-side partial contour may for example be taken from a basic serration that is to be improved by the method according to the invention, or it may be adjusted by a user specification. The root-side starting contour is used as a basis for the rest of the method and may for example be taken from a basic serration to be improved, or it may be adjusted by a user specification.

In a second step, an adaptation region for at least a part of the root-side starting contour is selected. The adaptation region in this case constitutes a selectable segment or the entire root-side starting contour which is modified by the method according to the invention. The adaptation region is in this case adjustable on the basis of an algorithm, for example a knowledge-based engineering algorithm, or a user specification. In a third step, the root-side starting contour is modified with the aid of a correction specification. A profile of the root-side starting contour is modified by the correction specification, for example by thickening a tooth root region corresponding to the root-side starting contour or by reducing the corresponding tooth root region. By the modification of the root-side starting contour, it is converted into a root-side partial contour or root-side final contour. The terms "root-side final contour" and "root-side partial contour" are to be considered as synonymous hi the context of the application.

According to the invention, the correction specification is determined with the aid of a correction function which comprises at least one adjustable function parameter. In this case, the function parameter may be modified by an algorithm, for example an optimization algorithm, a predetermined table, or a further auxiliary function, or a user specification. In this way, an improved tooth root region of the tooth may be achieved, which in particular has an improved tooth root load capacity. In the case of undefined load edges, a tooth root load capacity increased by up to 15% may be achieved. In the case of a defined load edge, a tooth root load capacity increased by up to 20% may be achieved. The increase is in this case related to the basic serration which may be used as a starting point for the method. Serrations improved according to the invention may be produced with the same outlay in comparison with known serrations. Furthermore, additional requirements for the shape of the serration to be produced may be taken into account by the adjustability of the correction function. For example, the shape of the serration to be produced, in particular the root-side final contour or root-side partial contour to be determined, may be adjusted in such a way that it can be replaced with an underlying basic serration. Consequently, with substantially the same manufacturing outlay, the method according to the invention makes it possible to replace individually serrated machine components in a machine with ones having a serration improved according to the invention. This makes it possible to modify corresponding machines cost-efficiently according to requirements. In particular, the described method may be carried out symmetrically on both tooth edges of a tooth.

The root-side final contour forms a root-side final contour, or partial contour, which may be combined with the head-side partial contour. In the method according to the invention, machining manufacture of the serration is carried out on the basis of the head-side starting contour and the root-side final contour determined. The head-side partial contour and the root-side final contour, or root-side partial contour, determined belong to geometrical data of the tooth to be produced of the serration. By means of the geometrical data, for example, a tool which is configured for machining manufacture of the serration may be produced.

In one embodiment of the claimed method, the root-side starting contour may be configured substantially as an ellipse segment. Ellipses represent simply describable and calculable contours which can also offer a continuous transition to the head-side partial contour of the tooth and at the same time a continuous transition to an adjacent tooth. As an alternative or in addition, the heads side partial contour may be configured as an involute. An involute offers a high degree of load capacity when rolling over an opposing serration and may be produced simply with high precision. Furthermore, the combination of an involute as a head-side partial contour and an ellipse as a root-side starting contour offers the possibility of connecting them smoothly, i.e. providing a continuous transition, with reduced outlay. Both an involute and an ellipse can furthermore be mathematically described simply, so that the claimed method may also be carried out rapidly using simple hardware with relatively low calculation power.

Furthermore, the correction function may have a tooth space midpoint as the start point or as the end point. The claimed method may therefore be carried out substantially without overlap for each tooth of the serration. By the selection of the corresponding tooth space midpoint, a substantially continuous and tangential contour of the serration may straightforwardly be selected there. The tooth space midpoint may also be automatically determined straightforwardly. The position of the adaptation region may therefore be established at least partially autonomously by an algorithm. User specifications required for carrying out the method are thus minimized, which in turn simplifies the use of the method. In particular, a boundary condition of the correction function is thus defined for the correction function and its superposition with the root-side starting contour. Such a boundary condition may in turn be used for establishing the correction function. This simplifies the establishing of the correction function, which also comprises selecting or establishing function parameters. An advantageous correction function may consequently be determined with reduced calculation outlay.

In the claimed method, the correction function may furthermore have a transition point between the root-side starting contour and the head-side partial contour. The transition point may in this case be configured as a start point or end point of the correction function. Correspondingly, the transition point lies at a root-side end of the head-side partial contour. A boundary condition which may be used for establishing the correction function is thereby established. Such a boundary condition in turn offers a simplification in establishing the correction function, which also comprises selecting and establishing function parameters.

In another embodiment of the claimed method, the correction function may be configured as a polynomial, the coefficients of which are adjustable. The coefficients may for example be adjusted using an optimization algorithm, a table, an auxiliary function or a user specification. Polynomials may be adapted straightforwardly and may be adapted algebraically to boundary conditions, for example a predeterminable tangent continuity. There are furthermore rapid and proven optimization algorithms for the adaptation of polynomials. The claimed method may therefore be modified straightforwardly. The polynomial may furthermore be an at least third-order polynomial, preferably an at least fourth-order polynomial. Furthermore, as an alternative or in addition, a discontinuous transition may also be achieved between the root-side partial contour and the head-side partial contour. A discontinuous transition may, for example, be configured as a contour with a kink.

The third step, in which the root-side starting contour is modified, may furthermore be carried out repeatedly. The repeated conduct of the third step is in this case carried out while modifying at least one function parameter. Correspondingly, an optimized root-side partial contour may be determined rapidly and simply. For example, the third step may be carried out on the basis of a self-learning algorithm, or on the basis of a value table for at least one function parameter, the table being processed by systematic testing in the third step. The third step of the claimed method may furthermore be carried out until a predeterminable target parameter is reached. Such a target parameter may, for example, be a desired tooth root load capacity. Correspondingly, for example, a maximum for the tooth root load capacity may be achieved when reaching the target parameter.

The third step, in which the correction specification is determined, may furthermore be carried out with the aid of a boundary element method calculation, abbreviated to BEM calculation. In this case, only the surface of the serration in the region of the head-side or root-side starting contour, particularly in the adaptation region, is modeled and for example the mechanical stress distribution existing there is thus determined. A BEM calculation only takes a surface of the serration into account, which significantly reduces the calculation outlay, for example in comparison with a finite element method, abbreviated to FEM calculation. The surface of the serration is in this sense to be understood as a boundary contour of the serration. The present invention is based inter glia on the surprising discovery that in particular the combination of a root-side starting contour, which has an ellipse shape, ellipse segment shape or an ellipse arc shape, with a BEM calculation may be modified in such a way that the achievable tooth root load capacity is increased significantly.

Furthermore, the root-side starting contour may be an at least segmental approximation of a basic serration, which is to be considered as a starting serration. The latter is used as a starting basis, i.e. as a serration geometry which is to be improved by the claimed method. Approximations of existing serrations may be created straightforwardly, but are affected by errors. Frequently usable approximations of tooth root regions are ellipses or ellipse arcs, which can be mathematically described particularly simply. The claimed method is robust in relation to the errors which may occur between an existing serration and a corresponding approximation. Consequently, the claimed method is robust in relation to inaccurate starting values and may be carried out with little outlay in respect of preparation, i.e. modeling of a basic serration. The starting values may, for example, be provided by a user input. Consequently, the claimed method is suitable for providing an improved serration cost-efficiently.

In another embodiment of the claimed method, the correction function may be carried out by means of an algorithm, an auxiliary function, a predeterminable table, or a user specification. The correction function is therefore flexibly adaptable, so that the method may for example be improved with future improved algorithms, auxiliary functions or the like. Furthermore, the correction function may be modified by means of artificial intelligence, a self-learning algorithm, in the third step. As an alternative or in addition, the correction function may also be modified on the basis of data from a computer image of a machine component, a so-called digital twin.

The underlying object is furthermore achieved by a computer program product according to the invention. The computer program product is configured to be storable in executable form in a developer tool, for example a computer workstation. The computer program product may in this case be configured monolithically and executed entirely in the developer tool. As an alternative, the computer program product may also be configured modularly, individual functions of the computer program product being stored so that they can be executed outside the developer tool and being at least temporarily in communicative data connection with the developer tool during operation. The functions performed outside the developer tool may, for example, be stored in a computer cloud. Furthermore, the computer program product may be configured entirely as software or may also be configured at least partially in hard-wired form, for example as an application-specific integrated circuit, abbreviated to ASIC. The computer program product is configured at least to output geometrical data which describe a root-side partial contour or root-side final contour of a tooth in a serration. The computer program product may furthermore be configured to receive and process geometrical data of a root-side starting contour and/or a head-side partial contour of a tooth in a serration. According to the invention, the computer program product is configured to carry out a method according to one of the embodiments outlined above.

The described object is also achieved by a tool according to the invention. The tool may for example be designed as a hobbing cutter, form cutter or as a cutting wheel, with which the one serration is produced by machining processing during manufacture. The tool has a blade which comes into contact with a metallic material during the processing and thus produces the serration. The blade in this case has a shape which corresponds at least to a part of a root-side partial contour or root-side final contour which is produced by a method according to one of the embodiments presented above. The processing contour of the blade is accordingly derived from the root-side partial contour. For example, the processing contour may be a hobbing at least of the root-side partial contour. The root-side partial contour and/or the head-side partial contour according to the claimed method may be transferred onto a tool by which a desired shape of the serration can be produced. In particular, serrations optimized according to the claimed method may be produced directly. The tool according to the invention therefore makes it possible to produce serrations which are improved in respect of tooth root load capacity with substantially the same manufacturing outlay or manufacturing costs.

The outlined object is likewise achieved by a machine component according to the invention, which may be configured as an externally serrated component, for example as a spur wheel, or as an internally serrated component, for example as a ring wheel. As an alternative, the machine component may furthermore also be configured as a toothed rack. The machine component has a serration which comprises a multiplicity of teeth. At least one of the teeth has a root-side partial contour which merges into a head-side partial contour. The root-side final contour is configured according to the invention in at least one segment as a superposition of an ellipse segment with a polynomial curve. This is to be understood, as viewed from a start point to an end point of the polynomial curve, as an addition of the function values of the polynomial curve with the function values of an ellipse function. This superposition may, for example, be defined by an embodiment of the claimed method which, in turn transferred to a claimed tool, produces this superposition on the root-side partial contour. The machine component may thus be produced on the basis of the outlined method. A root-side partial contour which corresponds to a superposition of an ellipse segment and a polynomial curve offers an increased degree of tooth root load capacity and may straightforwardly be produced rapidly and reliably.

The head-side partial contour of the machine component may furthermore be configured as an involute. An involute offers an advantageous hobbing behavior and a high load capacity in a serration. The above-described advantages of the claimed solution are thus implemented to an increased extent. Furthermore, the root-side partial contour may merge continuously into the head-side partial contour.

The underlying object is also achieved by a gearing which has an input shaft and an output shaft, the gearing modifying a rotational speed and a torque from the input shaft to the output shaft. The gearing may be configured as a spur wheel gearing, as a worm gearing, as a bevel gearing, as a hypoid gearing, as a planetary gearing or as a combination thereof. The gearing has externally serrated cogwheels and/or at least one internally serrated ring wheel and/or a toothed rack as machine components. According to the invention, at least one of the aforementioned machine components has a serration which is produced according to one of the methods outlined above, i.e. is configured as one of the machine components according to the invention. The gearing may be configured as a gearing for wind turbines, for industrial applications, for ship propulsions, for rail vehicles or for land vehicles, i.e. non-railborne vehicles.

BRIEF DESCRIPTION OF THE DRAWING

The invention will be described below with the aid of individual embodiments. The features of the individual embodiments may be combined with one another in this case. The figures are to be interpreted as mutually complimentary insofar as identical references in the figures also have the same technical meanings. In detail.

DETAILED DESCRIPTION OF PREFERRED EMBODIMENTS

Figure 1:
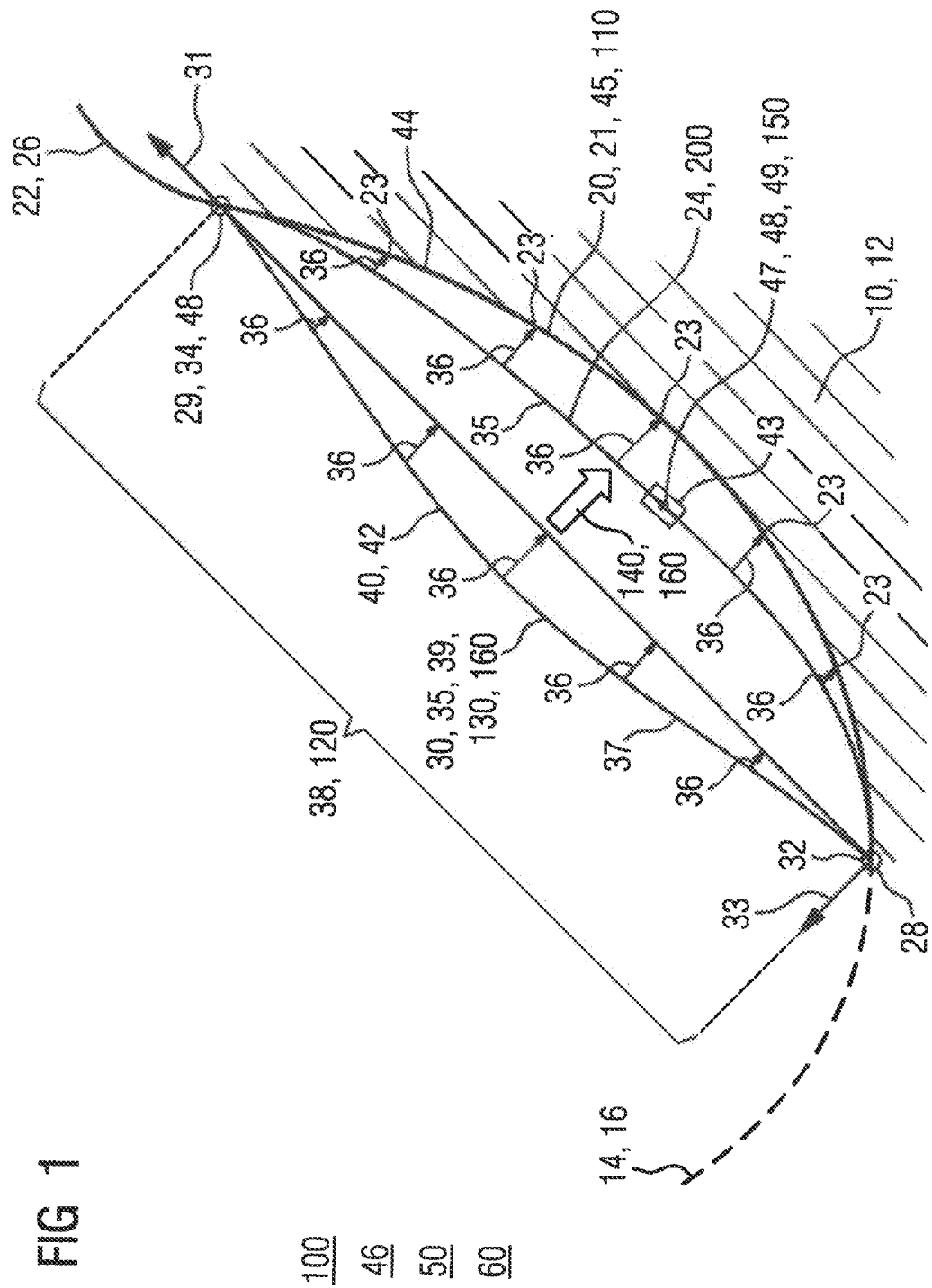
FIG. 1 shows a schematic detail view of a first embodiment of the claimed method and of a claimed machine component.

FIG. 1 schematically shows a detail view of a claimed method 100 by which a serration 10 is produced on a machine component 60. FIG. 1 is represented as a normal section. The method 100 is represented by way of example with reference to a tooth 12 which belongs to the serration 10 to be produced. The method 100 is based on a basic serration 44, which is a serration of an already existing machine component which is improved by means of the method 100. The basic serration 44 is approximated in a first step 110 by a root-side starting contour 20, which is configured as an ellipse segment 21. The approximation 45 by the ellipse segment 21 represents a simple but sufficiently exact foundation for the purposes of the method 100. The root-side starting contour 20 extends between a tooth space midpoint 28 and merges at a transition point 29 into a head-side partial contour 22, the transition point 29 substantially being configured as a saddle point and thus allowing a continuous transition between the head-side partial contour 22 and the root-side starting contour 20. An adjacent tooth 14 follows on with its tooth rear side 16 from the tooth space midpoint 28 in one direction. The head-side partial contour 22 of the tooth 12 is configured as an involute 26. With the presence of the head-side partial contour 22 and the root-side starting contour 20, the first step 110 is completed.

In a second step 120, an adaptation region 38 in which the root-side starting contour 20 is to be modified, i.e. to be optimized, is selected. The adaptation region 38 extends between the tooth space midpoint 28 and the transition point 29 to the head-side partial contour 22. The adaptation region 38 is therefore delimited by a start point 32 and an end point 34, the position of which is adjustable, i.e. selectable, in the second step 120 by means of a user specification or an algorithm, for example a knowledge-based engineering algorithm.

Between the start point 32 and the end point 34, there is an extent axis 31 and perpendicularly thereto a value axis 33, onto which a correction function 30 that is to be set up for a third step 130 of the method 100 is defined. The correction function 30 is configured as a graph 37 of a polynomial 40, i.e. as a polynomial function. By a multiplicity of function values 36 of the correction function 30, a correction specification 35 that is to be applied to the root-side starting contour 20 is defined in the third step 130. Since the correction function 30 is substantially a polynomial 40, it may be adjusted by a multiplicity of function parameters 39. In the case of a polynomial 40 as in FIG. 1, these function parameters 39 are coefficients 42. The correction function 30 has zero as the function value 36 at the start point 32 and at the end point 34. Consequently, a root-side partial contour 24 to be determined by means of the method 100 remains at the transition point 29 and at the tooth space midpoint 28. In this way, discontinuities at these locations are prevented.

In a fourth step 140, the correction specification 35 is applied to the root-side starting contour 20. For this purpose, the root-side starting contour 20 is considered as a function in the coordinate system of the extent axis 31 and the value axis 33 and is superimposed with the correction specification 35. For this purpose, the function values 36 of the correction specification 35 and corresponding points 23 of the root-side starting contour 20 are added along the value axis 33. The root-side partial contour 24 is formed by this superposition. Target parameters 48 are taken into account during the formation of the root-side partial contour 24. One of the target parameters 48 according to FIG. 1 is a continuous transition between the root-side partial contour 24 and the head-side partial contour 22. A further target parameter 48 according to FIG. 1 consists in a predeterminable tooth root load capacity 47. The tooth root load capacity 47 on the root-side partial contour 24 determined may, for example, be determined by means of a boundary element method calculation 49. A boundary element method calculation 49 only takes into account contour elements 43 which lie directly on the root-side partial contour 24, i.e. on its surface.

The third step 130 is carried out repeatedly, while modifying the correction specification 35, until the target parameters 48 are fulfilled. Fulfillment or lack of a target parameter 48 may be determined in a fifth step 150. During repeated conduct of the third step 130, the function parameters 39 of the correction function 30 are varied, i.e. the coefficients 42 of the polynomial 40 are modified. This modification or variation is carried out systematically by means of a user specification, an algorithm, a value table, an auxiliary function and/or artificial intelligence. The third and fourth steps 130, 140 thus run through a feedback loop, which is to be considered as a sixth step 160, until the root-side partial contour 24 or root-side final contour 24 is ascertained as the result 200 of the method 100. The root-side partial contour 24 determined in this way and the head-side partial contour 22 belong to geometrical data 46 of a tooth 12 of a serration 10. The geometrical data 46 may be used in order to produce a tool 50 (not depicted in detail) which is configured for machining manufacture of the serration 10.

Figure 2:
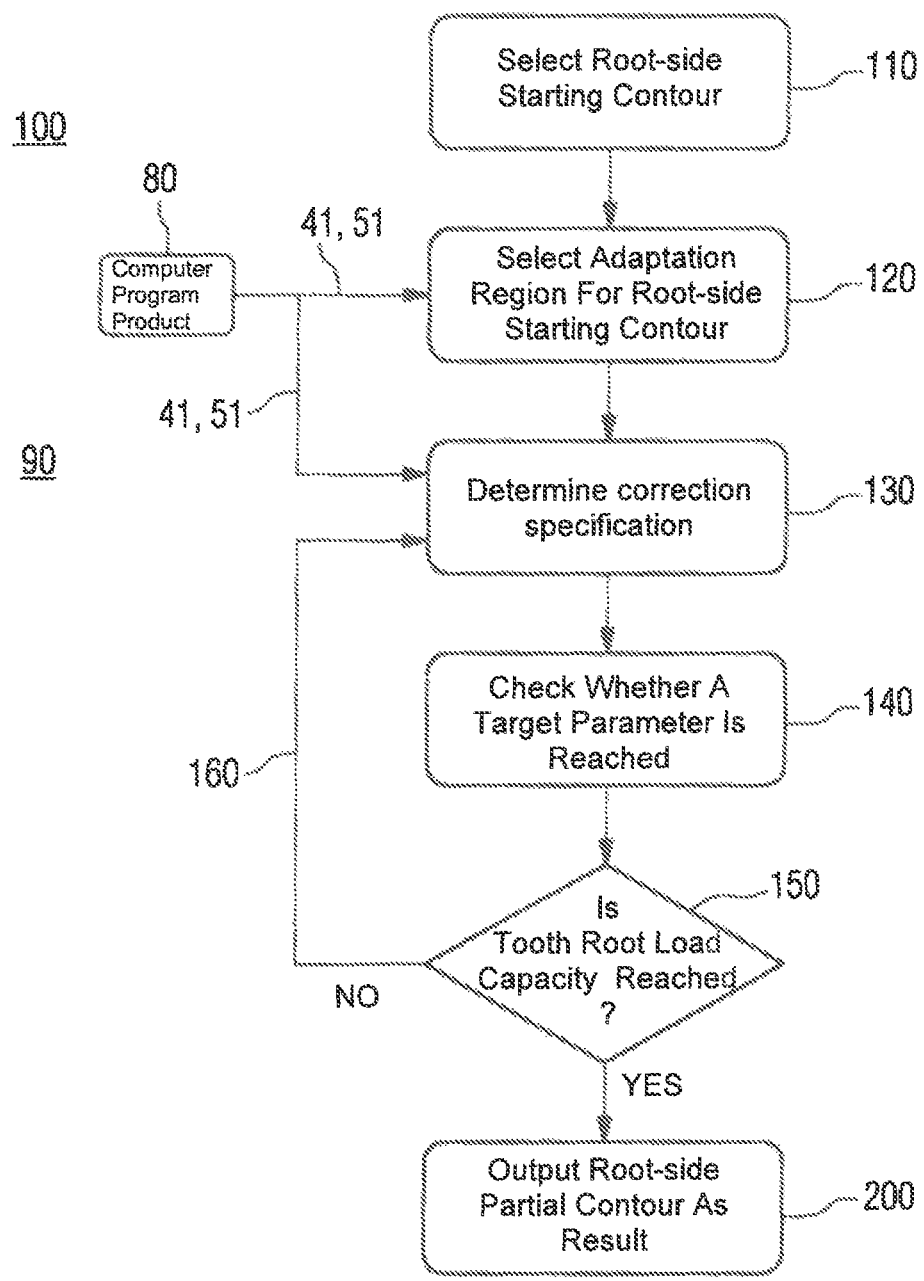
FIG. 2 shows a flowchart of a second embodiment of the claimed method.

FIG. 2 represents a flowchart of a second embodiment of the claimed method 100. The method 100 starts from a first step 110, in which a root-side starting contour 20 for a tooth 12 of a serration 10 to be produced is selected. In the first step 110, a head-side partial contour 22 of the tooth 12 is also selected. The root-side starting contour 20 is to be refined by the method 100 to form a root-side partial contour 24. In a subsequent second step 120, an adaptation region 38 for the root-side starting contour 20 is selected and established. The selection in the second step 120 is carried out by means of a user specification 41 and/or an algorithm 51, using a computer program product 80 in which the method 100 is carried out. The computer program product 80 is in this case executed in a developer tool 90. The adaptation region 38 defines the segment in which the root-side starting contour 20 is to be refined to form the root-side partial contour 24. The adaptation region 38 is delimited by a start point 32 and an end point 34, between which a correction function 30 is to be placed. The positions of the start point 32 and of the end point 34 are defined by the selection of the adaptation region 38. An extent axis 31 and a value axis 33, on which a third step 130 is based, are likewise defined by the adaptation region 38.

In the subsequent third step 130, a correction specification 35 is determined by means of a correction function 30. The correction function 30 has a graph 37 between the start point 32 defined in the second step 120 and the end point 34. The correction function 30 generates a multiplicity of function values 36 in the adaptation region 38. The function values 36 are superimposed in a fourth step 140 with corresponding points 23 on the root-side starting contour 20. For this purpose, the points 23 on the root-side starting contour 20 are considered as function values along the extent axis 31 and the value axis 33 of the correction function 30 and the function values 36 of the correction function 30 are added thereto. A root-side partial contour 24 which lies next to the head-side partial contour 22, i.e. merges into the latter, is thereby generated. In the fourth step 140, a check is carried out as to whether a target parameter 48 is reached by the refinement of the root-side starting contour 20 to form the root-side partial contour 24. The target parameter 48 is in this case an increased tooth root load capacity 47.

This is followed by a fifth step 150, which is configured as a procedural branch. If the achieved tooth root load capacity 47 is not reached with the root-side partial contour 24 determined, a sixth step 160, which is configured as a feedback loop, is carried out. In this way, the third and fourth steps 130, 140 are performed again. When performing the first step 130 again, at least one function parameter 39 of the correction function 30 is varied. The variation is in this case carried out by means of a user specification 41 or an algorithm 51, which is executed in a computer program product 80. If it is found in the fifth step 150 that the achieved tooth root load capacity 47 satisfies the target parameter 48, i.e. it reaches or exceeds the latter, a result output 200 follows. In the latter, the root-side partial contour 24 determined is output as the result 200 of the method 100.

Figure 3:
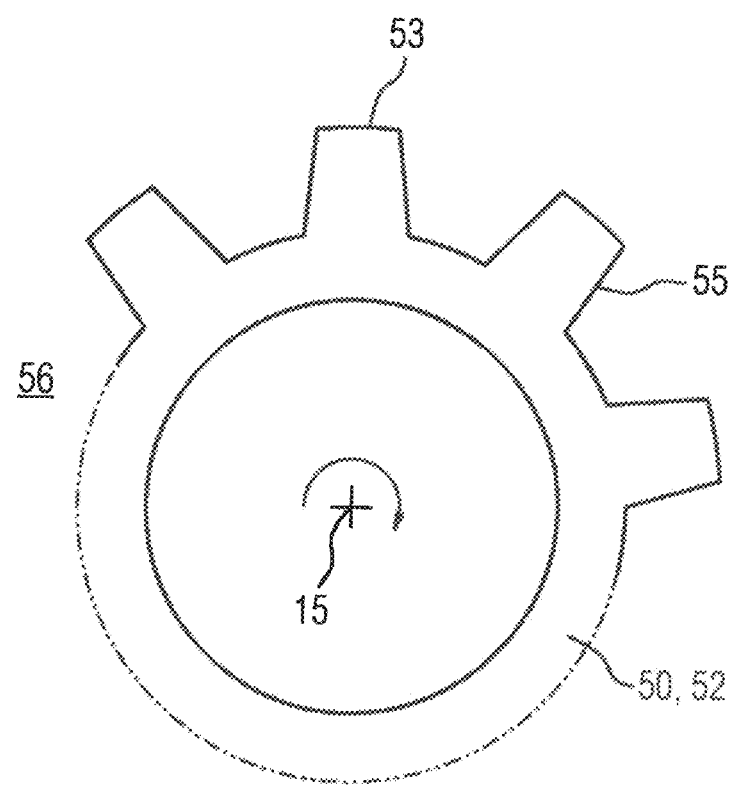
FIG. 3 shows a schematic view of one embodiment of the claimed tool.

FIG. 3 schematically shows a tool 50, which is configured as a cutting wheel. The cutting wheel 52 is configured to be rotatable about a rotation axis 15 and radially outwardly has a blade 55 which is configured for machining processing of a metallic material. In relation to a tool plane 56 lying in the plane of the drawing, the blade 55 is configured to correspond in shape at least on one side to a root-side partial contour 24. A processing contour 53 is correspondingly defined by the blade 55. The tool 50 is suitable for producing a corresponding serration 10, which comprises a corresponding tooth 12, with the processing contour 53, i.e. the blade 55, from a serration blank 58.

Figure 4:
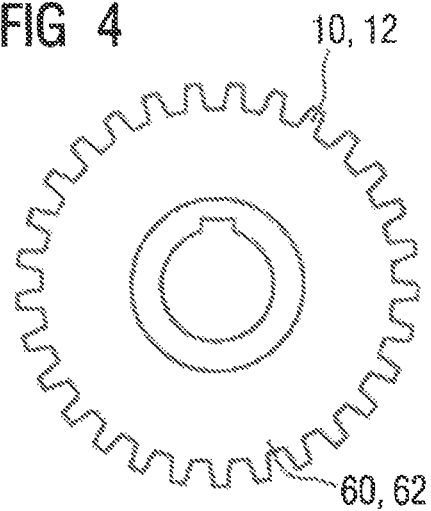
FIG. 4-7 show a schematic view of a plurality of embodiments of claimed machine components.
Figure 5:
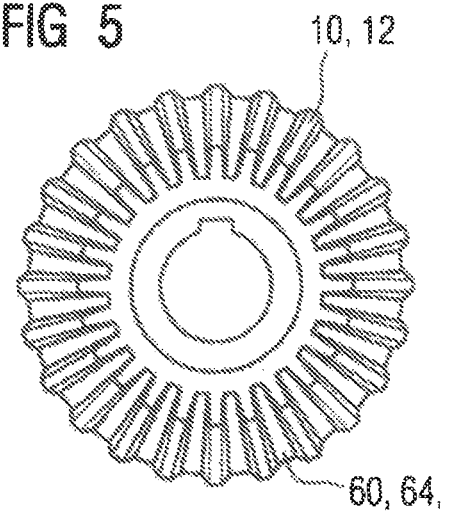
Figure 6:
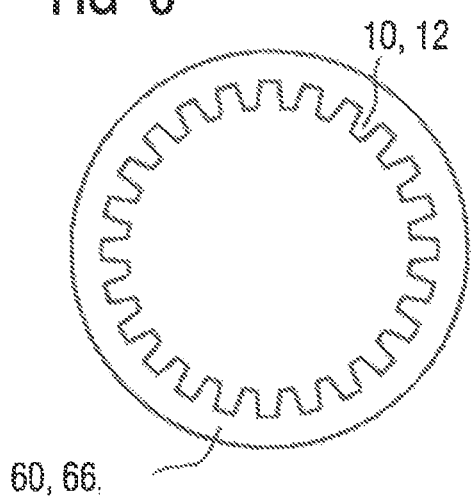
Figure 7:
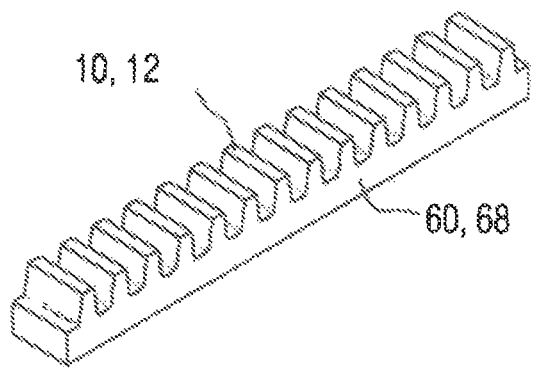
Figure 8:
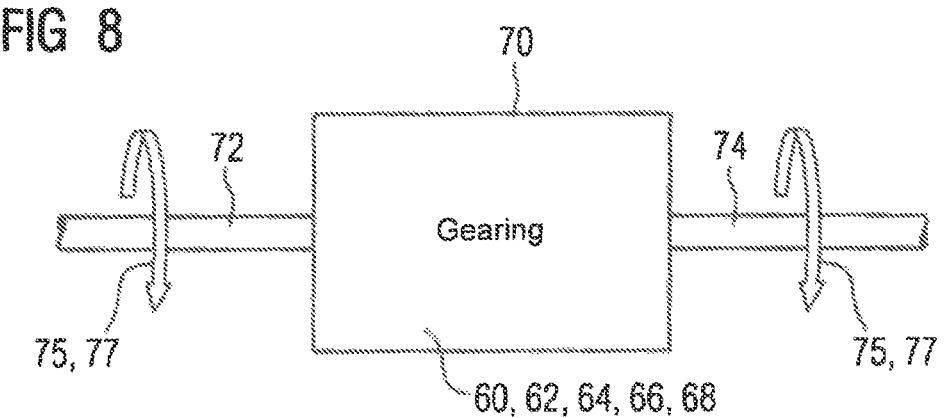
FIG. 8 shows a schematic structure of one embodiment of the claimed gearing.

FIG. 4 to FIG. 7 represent various machine components 60, which are respectively equipped with a serration 10 that has a tooth 12, the shape of which is established according to by means of a claimed method 100. One of the corresponding machine components 60 is an externally serrated cogwheel 62, as shown in FIG. 4, a further corresponding machine component 60 is a bevel wheel 64 according to FIG. 5. Furthermore, FIG. 6 shows an internally serrated ring wheel 66 and FIG. 7 shows a toothed rack 68. An improved tooth root load capacity 47 is achieved by the improved serrations 10 in these machine components 60 according to FIG. 4 to FIG. 7. Furthermore, FIG. 8 depicts a gearing 70 that has an input shaft 72 via which a torque 75 is fed to the gearing 70 with a particular rotational speed 77. The gearing 70 also has an output shaft 74, via which a torque 75 is also delivered with a particular rotational speed 77. By the gearing 70, the torque 75 and the rotational speed 77 are modified from the input shaft 72 to the output shaft 74. The gearing 70 has at least one externally serrated cogwheel 62, a bevel wheel 64, an internally serrated ring wheel 66 and/or a toothed rack 68, which are produced according to a claimed method 100.

The invention claimed is:

1. A method for producing a serration, comprising:
   a) selecting a root-side starting contour configured as an ellipse segment and a head-side partial contour of a tooth;
   b) selecting an adaptation region for at least a part of the root-side starting contour;
   c) determining for the adaptation region a correction specification determined using a correction function configured as an at least third-order polynomial having at least one adjustable function parameter comprising adjustable coefficients;
   d) modifying the root-side starting contour using the correction specification to form a root-side final contour, and
   e) producing, by chip-removing machining, a tooth geometry comprising the head-side partial contour and the root-side final contour.

2. The method of claim 1, wherein the head-side partial contour is configured as an involute.

3. The method of claim 1, wherein the correction function has a tooth space midpoint as a start point or as an end point.

4. The method of claim 1, wherein the correction function has a transition point between the root-side starting contour and the head-side partial contour.

5. The method of claim 1, wherein at least step c) is carried out repeatedly while modifying the at least one adjustable function parameter.

6. The method of claim 1, wherein step c) is carried out until a predeterminable target parameter is reached.

7. The method of claim 1, wherein at least step c) is carried out using a boundary element method calculation.

8. The method of claim 1, wherein the root-side starting contour is configured at least in segments as an approximation of a serration of an existing machine component.

9. The method of claim 1, wherein the correction function is adjusted by at least one of an algorithm, a function, a table, and a user input.

10. A computer program product embodied on a non-transitory computer-readable medium and comprising executable program instructions storable in a memory of a developer tool, wherein the program instructions when read from the memory and executed by a processor of the developer tool, cause the developer tool to
   output geometrical data of a root-side starting contour of a tooth geometry configured as an ellipse segment and a head-side partial contour of a tooth;
   select an adaptation region for at least a part of the root-side starting contour;
   determine for the adaptation region a correction specification determined using a correction function configured as an at least third-order polynomial having at least one adjustable function parameter comprising adjustable coefficients;
   modify the root-side starting contour using the correction specification to form a root-side final contour, and
   produce, by chip-removing machining a tooth geometry comprising the head-side partial contour and the root-side final contour.

* * * * *